July 20, 1954  C. E. STORY  2,684,071
THERAPEUTIC APPLIANCE FOR TREATMENT OF ANIMALS
Filed Feb. 11, 1953  2 Sheets-Sheet 1
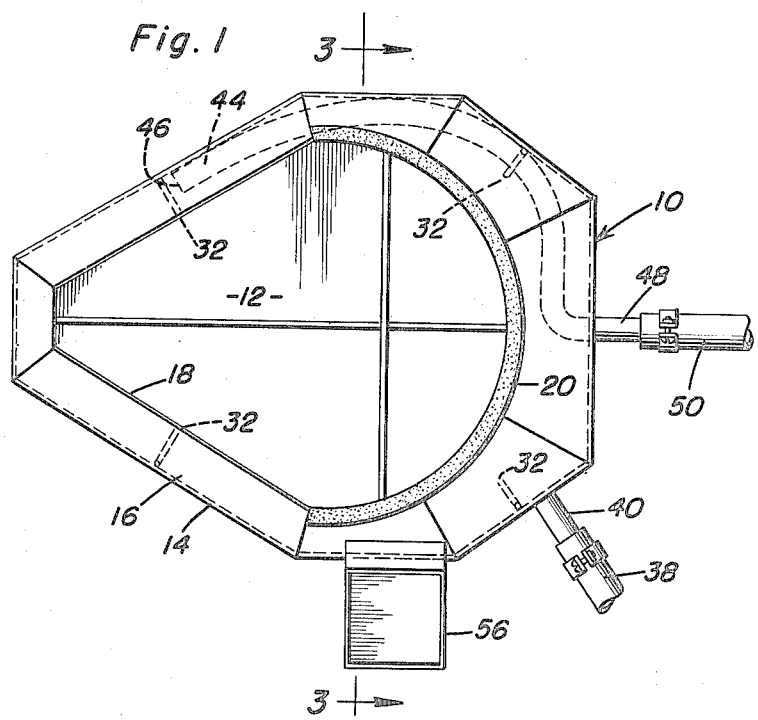
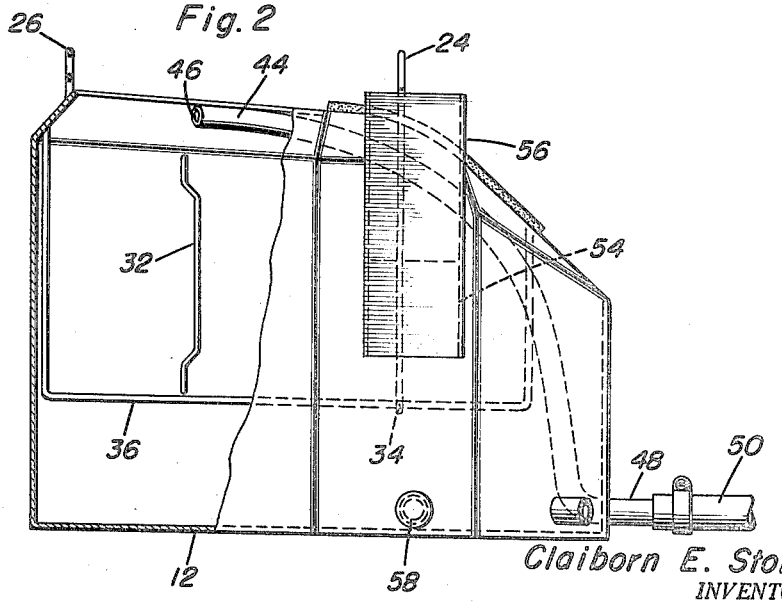
Claiborn E. Story
INVENTOR.

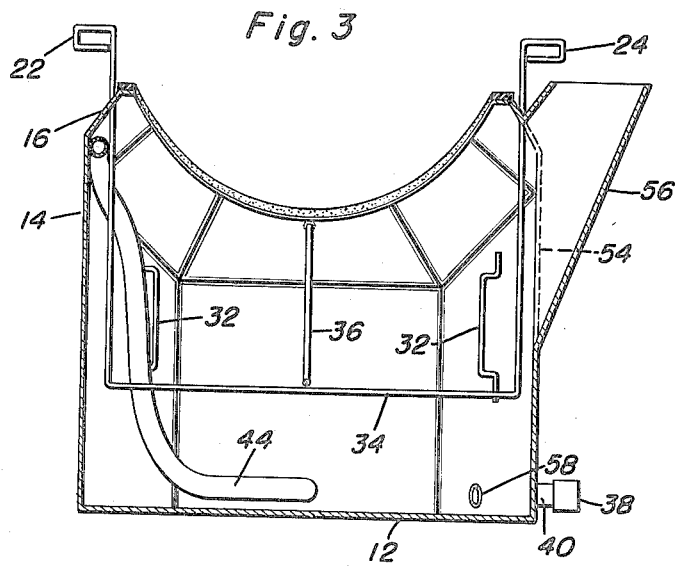
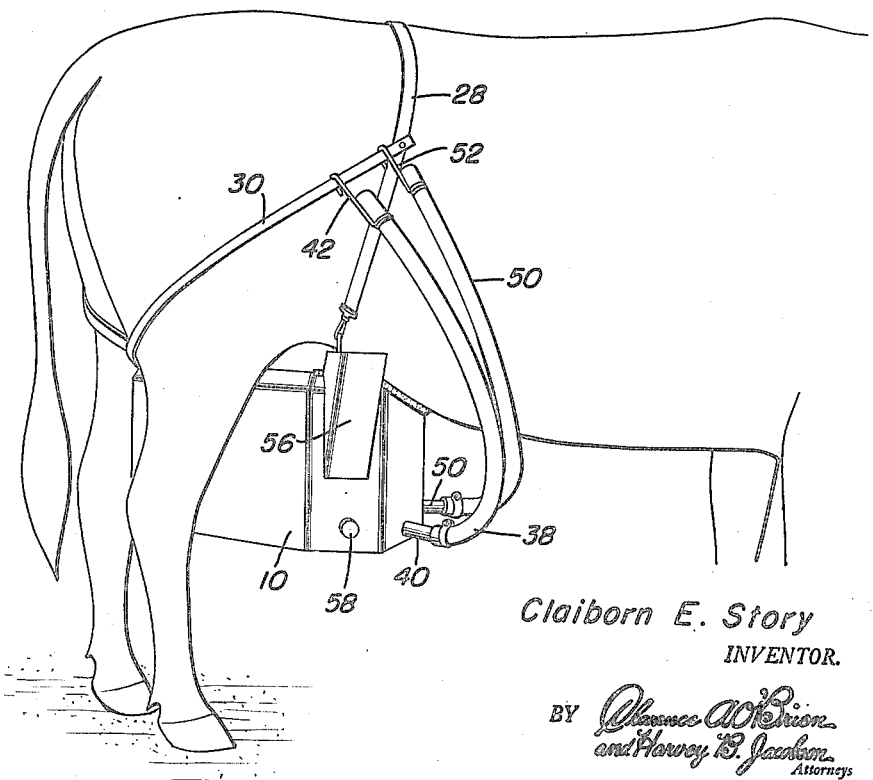

Patented July 20, 1954

2,684,071

UNITED STATES PATENT OFFICE 2,684,071

THERAPEUTIC APPLIANCE FOR TREATMENT OF ANIMALS

Claiborn E. Story, Council Bluffs, Iowa

Application February 11, 1953, Serial No. 336,223

2 Claims. (Cl. 128—402)

This invention relates to a therapeutic appliance to be used in the treatment of mastitis and other infections of the mammary glands of cows and may be used for the treatment of other domestic animals.

One of the most effective means of treating mastitis and other infections located in the udders of cows is the application of heat locally so as to cause an induced fever to combat the germs of the infection thus aiding nature in its combat against these infectious bacteria. It is therefore the primary object of this invention to provide simple and efficient means for applying heat to the udder of a cow.

A further object of the invention resides in the provision of a fluid container for use in supporting a quantity of heated fluid against the udder of a cow to induce a fever locally while providing a gentle massaging action by the circulation of heated fluid about the udder.

The construction of this invention features the use of a container having the upper edges thereof configurated to conform with the under portions of a cow and which employs means for circulating water within the container while spacing the udder of the cow from the side walls of the container. It is entirely within the concept of this invention to provide an insulative covering for the container so as to reduce the loss of heat in the fluid circulated if such is desired.

Still further objects of this invention reside in the provision of an appliance of the described nature that is strong and durable, capable of being manufactured at a relatively low cost, easily attached to a cow, and which may be used in conjunction with conventional boilers for circulating heated fluid in the treatment of various infections of the mammary glands of animals.

These, together with the various ancillary objects and features of the invention which will become apparent as the following description proceeds, are attained by this therapeutic appliance, a preferred embodiment of which has been illustrated in the accompanying drawings, by way of example only, wherein:

Figure 1 is a top plan view of the therapeutic appliance comprising the present invention;

Figure 2 is a side elevational view of this device with parts thereof being shown in section for greater detail;

Figure 3 is a vertical sectional view as taken along the plane of line 3—3 in Figure 1; and, Figure 4 is a perspective view showing the device as supported by straps during the treatment of a cow.

With continuing reference to the accompanying drawings wherein like reference numerals designate similar parts throughout the various views, reference numeral 10 generally designates a container having a bottom 12 and side walls 14 of any suitable configuration. The upper portion of the side walls 14 as indicated at 16 are bent inwardly and the upper edges 18 thereof are shaped to conform to the configurations of a cow in the area of its mammary glands or udder. The front forward portions of the upper edges 18 have bonded thereto a gasket formed of foam rubber or the like which is used in providing a seal between the cow and the container 10 and also provides a padding so as not to provide any discomfort to the animal on which the device is suspended.

A pair of eye members 22 and 24 are welded or otherwise secured to the upper portions 16 of the side walls 14 as is another eye member 26 at the rear of the container. A strap 28 is detachably secured to the eye members 22 and 24 and extends over the back of the cow to be treated. A second strap 30 is terminally attached to the strap 28 and is engaged in the eye member 26. This supports the container 10 below the udder of the animal being treated. Pairs of rods 32 are secured to the side walls 14 of the container in order to space and hold the udder away from the side walls. Other substantially U-shaped spacers 34 and 36 depend from the upper portion 16 of the side walls 14 and are used in spacing the udder from the bottom 10 of the container. In this manner the udder is held in spaced relationship from the container.

Water is introduced through an inlet conduit 38 to an inlet fitting 40 welded or otherwise secured to the side wall 14 adjacent the bottom 12. At the free end of the conduit there is provided a hook 42 for engagement with the strap 30 so as to hold the conduit 38 in such manner so as to permit movement of the animal treated. The conduit 38 may be attached to the discharge end of a boiler or hot water heater which may rigged to deliver water at a predetermined temperature preferably at about 125° F. An overflow tube 44 is welded at its open upper end 46 to the upper portion 16 of the side walls 14 and passes downwardly within the container adjacent the side walls to communicate with the discharge fitting 48 attached to the side walls 14 at the foremost portion of the container 10 and adjacent the bottom 12. A discharge conduit 50 is clamped about the discharge fitting 48 and may be attached to the inlet end of the hot water heater so as to insure continuous circulation of heated water or fluid within the container 10. Another hook 52 is provided on the free end of the conduit 50 for engagement with the strap 30 when the conduit 50 is not connected to the hot water heater.

An access opening 54 is formed in side wall 14 of the casing and in communication with the opening and overlying the opening there is positioned slantingly upwardly and outwardly a rectangular tubular access tube 56 through which a hand may be inserted in order to stir the water in the container when a circulating system is not otherwise being used. The access opening 56 is large enough in order that the hand may be further placed within the container so as to enable the udder to be massaged as may be necessary. A drain plug 58 may be provided if considered necessary.

The circulation of heated fluid within the container 12 is of great value in the treatment of mastitis and other diseases of the udder. If not used in conjunction with a circulating heating system, the device may be provided with a coating of insulative material so as to insure that the heated fluid is maintained in a heated state for a long period of time.

Since from the foregoing, the construction and advantages of this therapeutic appliance are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

What is claimed as new is as follows:

1. A therapeutic appliance for the treatment of diseases of animals comprising a container having an upper edge thereof shaped to conform with the configurations of an animal about the mammary glands thereof, means to secure said container to said animal, a fluid inlet conduit secured to the container, an overflow conduit attached to said container, and an access tube opening into and secured to said container extending outwardly and above the uppermost edge of said container.

2. A therapeutic appliance for the treatment of diseases of animals comprising a container having an upper edge thereof shaped to conform with the configurations of an animal about the mammary glands thereof, means to secure said container to said animal, a fluid inlet conduit secured to the container, an overflow conduit attached to said container, and an access tube opening into and secured to said container extending outwardly and above the uppermost edge of said container, said inlet conduit being secured to and opening into said container adjacent the bottom portions of said container, said overflow conduit being positioned adjacent said upper edge of said container and extending downwardly within said container and outwardly of said container adjacent said bottom portions of said container.

References Cited in the file of this patent

UNITED STATES PATENTS

| Number | Name | Date |
| --- | --- | --- |
| 1,684,047 | Stoven | Sept. 11, 1928 |
| 2,272,481 | Rinkes et al. | Feb. 10, 1942 |